United States Patent [19]

Künzel

[11] Patent Number: 5,719,482
[45] Date of Patent: Feb. 17, 1998

[54] PROCESS AND DEVICE FOR FIELD-ORIENTED CONTROL OF A POLYPHASE MACHINE

[75] Inventor: Stefan Künzel, Erlangen, Germany

[73] Assignee: Siemens Aktiengesellschaft, Munich, Germany

[21] Appl. No.: 736,119

[22] Filed: Oct. 25, 1996

[30] Foreign Application Priority Data

Oct. 26, 1995 [EP] European Pat. Off. ............ 95116902

[51] Int. Cl.⁶ ..................................................... H02P 5/40
[52] U.S. Cl. .......................... 318/800; 318/805; 318/807; 318/798
[58] Field of Search ........................... 318/790–832; 363/40–46

[56] References Cited

U.S. PATENT DOCUMENTS

| | | | |
|---|---|---|---|
| 4,314,190 | 2/1982 | Walker et al. | 318/798 |
| 4,388,577 | 6/1983 | Blaschke et al. | 318/717 |
| 4,677,360 | 6/1987 | Garces | 318/803 |
| 4,707,651 | 11/1987 | Schauder | 318/800 |
| 4,724,373 | 2/1988 | Lipo | 318/805 |
| 4,780,650 | 10/1988 | Miyazaki et al. | 318/71 |
| 4,792,741 | 12/1988 | Matsuo et al. | 318/800 |
| 4,885,518 | 12/1989 | Schauder | 318/798 |
| 4,885,520 | 12/1989 | Sugimoto et al. | 318/808 |
| 5,166,593 | 11/1992 | De Doncker et al. | 318/800 |
| 5,212,438 | 5/1993 | Miyaaki et al. | 318/805 |
| 5,272,429 | 12/1993 | Lipo et al. | 318/808 |
| 5,334,923 | 8/1994 | Lorenz et al. | 318/805 |
| 5,365,158 | 11/1994 | Tanaka et al. | 318/806 |
| 5,386,186 | 1/1995 | Gritter | 318/798 |

FOREIGN PATENT DOCUMENTS

| | | |
|---|---|---|
| 0 117 514 A3 | 9/1984 | European Pat. Off. . |
| 0 474 629 B1 | 3/1992 | European Pat. Off. . |
| 0 553 370 A1 | 8/1993 | European Pat. Off. . |
| WO 90/15472 | 12/1990 | WIPO . |

OTHER PUBLICATIONS

A.A. Ganji et al., "Rotor Time Constant Compensation of an Induction Motor in Indirect Vector Controlled Drives," EPE '95 Conf., Seville, Spain 1995, pp. 1.431–1.436.

*Primary Examiner*—Paul Ip
*Attorney, Agent, or Firm*—Kenyon & Kenyon

[57] ABSTRACT

A process and device for field-oriented control of a polyphase machine, where a torque-producing quantity is regulated via a speed control circuit and a flux-producing quantity is regulated via a field control circuit that determines the magnitude and angle of the flux. The flux magnitude is injected through the field control circuit. Orientation errors in the field axis are corrected through frequency adjustment, specifically by adjusting the slip frequency according to the difference between the transformation angle used and the flux angle. The voltages and currents that create the rotational field of the machine are generated via a current control circuit in accordance with the corrected reference values.

11 Claims, 2 Drawing Sheets

PROCESS AND DEVICE FOR FIELD-ORIENTED CONTROL OF A POLYPHASE MACHINE

FIELD OF THE INVENTION

The present invention relates to the field-oriented control of a polyphase machine.

BACKGROUND INFORMATION

So far, mainly d.c. drives have been used as variable-speed drives, which are used especially with numerically controlled machine tools and robots, but also in other applications in automation technology. Such drives can be regulated easily, but they require maintenance by skilled personnel due to the presence of a commutator. Furthermore, such a commutator is subject to high wear, which has a negative effect on the lifetime of a d.c. machine. To achieve complete freedom from maintenance in particular, asynchronous machines or polyphase machines are being used to an increasing extent. The absence of a commutator eliminates the rpm-dependent power limitation, so the full motor torque is available, even at rest. However, in order to achieve the required quality of speed control, an expensive power supply element is needed with two-fold power conversion, namely an a.c.-d.c.-a.c. conversion, in comparison with a d.c. drive. Furthermore, a complex control structure is needed. Advances in the field of power semiconductors due to fast tripping switches as well as advances in electronic information processing by very powerful microprocessors, have now made it possible to design devices that operate according to the field orientation principle for the demanding application in machine tools.

In the processes used so far for field-oriented control of polyphase machines, a torque-producing and flux-producing variable is created, where the flux quantity is determined from a current model and the flux position is determined by an indirect method. In these processes, when the magnetizing reactance of the motor or the rotor resistance deviates from the data used in the model, it can lead to a change in voltage demand or a faulty orientation. The magnetizing reactance changes due to magnetic saturation or the manufacturing tolerance of the air gap. Therefore, differences of up to 20% in magnetizing reactance are possible in motors of the same type. The rotor resistance changes with the temperature of the rotor and results in a faulty orientation when there are deviations from specified model parameters. However, such a faulty orientation results either in inadvertently reaching the voltage ceiling and thus a negative effect on the control characteristics or in a loss of motor output due to the excessively low voltage.

The changes in the magnetizing reactance in prior art solutions to this problem are taken into account through a desaturation characteristic, and the change in rotor resistance is taken into account by a temperature model. Scattering in motor data and errors in the temperature model are not taken into account and lead to a loss of power. The temperature model based on the stator temperature is inaccurate to some extent, particularly in water-cooled motors.

A known method of regulating the current for field-oriented control of polyphase machines that works with control parameters in a cartesian coordinate system operates according to the so-called d/q method, where the spatial vector of the current with the angle of the present position of the rotor, the stator or the main flux is transferred to a coordinate system that rotates with the flux position. The component in the direction of the flux (d component) as well as the component normal to the direction of flux (q component), which are constant and steady-state quantities, are regulated with a compensating regulator such as an integral controller. The flux-producing and torque-producing current are used as reference values. The output of the controller is the voltage vector in flux coordinates that is transformed back to the stator-oriented system with the angle of the flux position.

Such a method has the disadvantage that there may be a loss of orientation in the voltage ceiling, especially in generator operation of the polyphase machine, which can have serious consequences for the drive performance. This is due to the fact that the flux position in the voltage ceiling is determined incorrectly. As a result, it may no longer be possible to adjust the torque of the polyphase machine as desired, and an overload current may occur in generator operation. Since the maximum possible torque of a polyphase machine is proportional to the square of the voltage, operation near the voltage ceiling is always the goal, although this entails the aforementioned disadvantages when using the traditional method.

European published Patent Application No. 0 474 629 B1 describes a process which eliminates the problem of loss of orientation in the voltage ceiling by means of current regulation with implicit field attenuation with the help of an analog control method that works like the d/q method except that it uses variables given in a polar coordinate system for control purposes. Any deviation in angle or amplitude is corrected in magnitude and angle. In this process, reference values for the current are produced and then further processed with phase current regulators. This approach, however, entails the serious disadvantage of requiring long computation times, and as such has been implemented only in hardware so far. However, this method does not have the above-mentioned loss of orientation (flux determined incorrectly because it is determined indirectly). Implementation in the form of digital controllers is impossible because of the computation capacity it would require. The d/q method has proven to be better in this regard.

In addition, there are other known methods of field-oriented control of polyphase machines where the flux is determined. Such a determination of flux is performed by integration of voltages. In such an integration, however, a minor error in the input can lead to a major error at the output, and furthermore, the result may vary by a constant value, so correcting algorithms are necessary in such a procedure. However, such correcting algorithms require a computation capacity that could be used to advantage elsewhere. They also lead to long transient recovery times, so the flux detected is available only after a time lag. This is a disadvantage, especially in view of the high dynamic demands that are typical today.

European published Patent Application No. 0 553 370 A1 describes a device for regulating polyphase machines without detection of the rotor position. The power and the current value are needed as the basis for the analysis but require a hardware circuit or extensive computations although they are steady-state values for this purpose. Thus, direct processing of voltages and currents as is known in control processes using a secondary controller is impossible.

SUMMARY OF THE INVENTION

An object of the present invention is to provide a process and a device for the field-oriented control of a polyphase machine which provides a method of flux determination and which tolerates fluctuations in the magnetizing reactance and in the rotor resistance (due to deviations in the actual motor parameters from the assumed model parameters) without inadvertently reaching the voltage ceiling or suffering a loss of power.

In addition, with the present invention it is possible to use not only steady-state parameters for control purposes but also the direct non-steady-state parameters such as voltage and current that are more difficult to handle, while avoiding the disadvantages of the traditional methods and devices for field-oriented control as discussed above such as the long transient recovery times of the control structures or instabilities and faulty orientations. In addition, the method and the respective device of the present invention are suitable for implementation in both hardware and software.

According to the general industrial practice in the field of field-oriented control methods, the terms "field" and "flux" are used in the same context as usual. However, it should be pointed out here that, strictly speaking, the flux is always the relevant variable. To facilitate understanding, however, the terms conventionally used in this industry will also be used in the following discussion.

The aforementioned object is achieved according to the present invention with the following process steps:

A torque-producing quantity is injected.

A flux-producing quantity is injected and is regulated by a field control circuit.

The flux is determined according to quantity (magnitude) and angle (phase), and the flux quantity is injected through the field control circuit.

Orientation errors in the field axis are corrected by a frequency adjustment, specifically by adjusting the slip frequency according to a difference between the transformation angle used and the flux angle determined.

The voltages and currents inducing the rotating field of the machine are generated via a current control circuit or a voltage control circuit according to the corrected reference values.

In a first advantageous embodiment of the process according to the present invention, an especially advantageous computation procedure is created that makes it possible to determine the flux with non-steady-state variables such as voltage and current. As a result, the correction is not left to chance, but instead appropriate correction measures can be taken due to an especially simple method of determining the flux. This is achieved with the additional process step of determining the rotor flux from the non-steady-state values of the stator voltage vector and the stator current vector in accordance with the following basic equation:

$$\Psi_R = \frac{L_R}{L_H} * \frac{U_S - R'I_S - L_G * \frac{dI_S}{dt}}{\left(j\omega_R - \frac{R_R}{L_R}\right)}$$

where:

$$R' = R_S + R_R * \frac{L_H^2}{L_R^2} \text{ and } L_G = L_S - \frac{L_H^2}{L_R}$$

$L_R$=rotor inductance
$L_H$=magnetizing inductance
$L_S$=stator inductance
$R_R$=rotor resistance
$R_S$=stator resistance
$\omega_R$=electric angular frequency of the rotor The flux magnitude ($|\Psi|$) and the flux angle ($\epsilon$) are determined from the above-calculated complex flux value by transformation of coordinates.

Furthermore, another advantageous embodiment of the process according to the present invention makes it possible for the method to be used for drives for which the rotor position is determined, as well as for drives where the rotor position is not determined. This is accomplished with the additional process step of determining the electric angular frequency of the rotor directly by measuring the actual rpm or the rotor position or by deriving the angular frequency indirectly from the signal for correcting the orientation or from an optional position control circuit.

In addition, another advantageous embodiment of the process according to the present invention achieves the result that torque surges and instabilities can be avoided in correcting the orientation. Furthermore, a quantity that is especially easy to determine is created for the correction. This is achieved by correcting the orientation rather gradually and gently, specifically by means of integral compensation and by determining the slip frequency as a quantity that is proportional to the quotient of the torque-producing quantity and the flux present.

In another advantageous embodiment of the process according to the present invention, the transition performance of the speed control is improved and the transient recovery of the orientation control is also reduced. This is accomplished with the additional process step of deriving a further correction signal for correcting the rotor resistance from the signal for correcting the orientation.

To implement such an advantageous process for field-oriented control of a polyphase machine according to the present invention in a simple manner, the object of this invention is achieved by means of a device having the following features:

Means for generating a flux-producing quantity and a torque-producing quantity.

Means for detecting the flux by amount and angle.

Means for controlling the field axis, specifically field regulation and current regulation.

Means for compensating for orientation errors in the field axis by means of a frequency adjustment, specifically by adjusting the slip frequency according to a difference between the transformation angle used and the flux angle detected.

Means for determining the voltages or currents that create the rotating field of the machine according to the corrected reference values.

A first advantageous embodiment of the device according to the present invention makes it possible to determine the flux accurately and with little computation expense in an especially simple manner. Furthermore, a quantity that is easy to determine and is especially suitable for influencing the orientation correction is created. This is accomplished with a computation unit which determines the flux in accordance with the following equation:

$$\Psi_R = \frac{L_R}{L_H} * \frac{U_S - R'I_S - L_G * \frac{dI_S}{dt}}{\left(j\omega_R - \frac{R_R}{L_R}\right)}$$

where:

$$R' = R_S + R_R * \frac{L_H^2}{L_R^2} \text{ and } L_G = L_S - \frac{L_H^2}{L_R}$$

$L_R$=rotor inductance
$L_H$=magnetizing inductance
$L_S$=stator inductance $R_R$=rotor resistance $R_S$=stator resistance $\omega_R$=electric angular frequency of the rotor.

The flux magnitude and angle are determined from the above-computed complex flux value by transformation of coordinates. In addition, the slip frequency is determined by a slip determining unit as a quantity that is proportional to the quotient of the torque-producing quantity and the flux present.

Another advantageous embodiment of the device of the present invention achieves the result that the device is also implemented effectively with drives for which the rotor position is determined. This is accomplished with the use of a tachometer or a position sensor for determining an actual speed or the rotor position of the polyphase machine for the purpose of speed control, which tachometer signal is also used to determine the electric angular frequency of the rotor.

Another advantageous embodiment of the device according to the present invention allows the device to be effectively implemented for such drives where the rotor position is not determined, yielding the advantages mentioned above. This is accomplished by deriving another signal from the signal for correcting the orientation which also serves as a quantity for speed control that corresponds to the actual rotational speed of the polyphase machine.

In another advantageous embodiment of the device according to the present invention, the transition behavior of the device is improved and furthermore the transient recovery times of the orientation controller contained therein are also shortened. This is accomplished by providing devices for correcting the rotor resistance, where the signal for correcting the orientation serves as a measure for correcting the rotor resistance.

DETAILED DESCRIPTION

Figure 1:
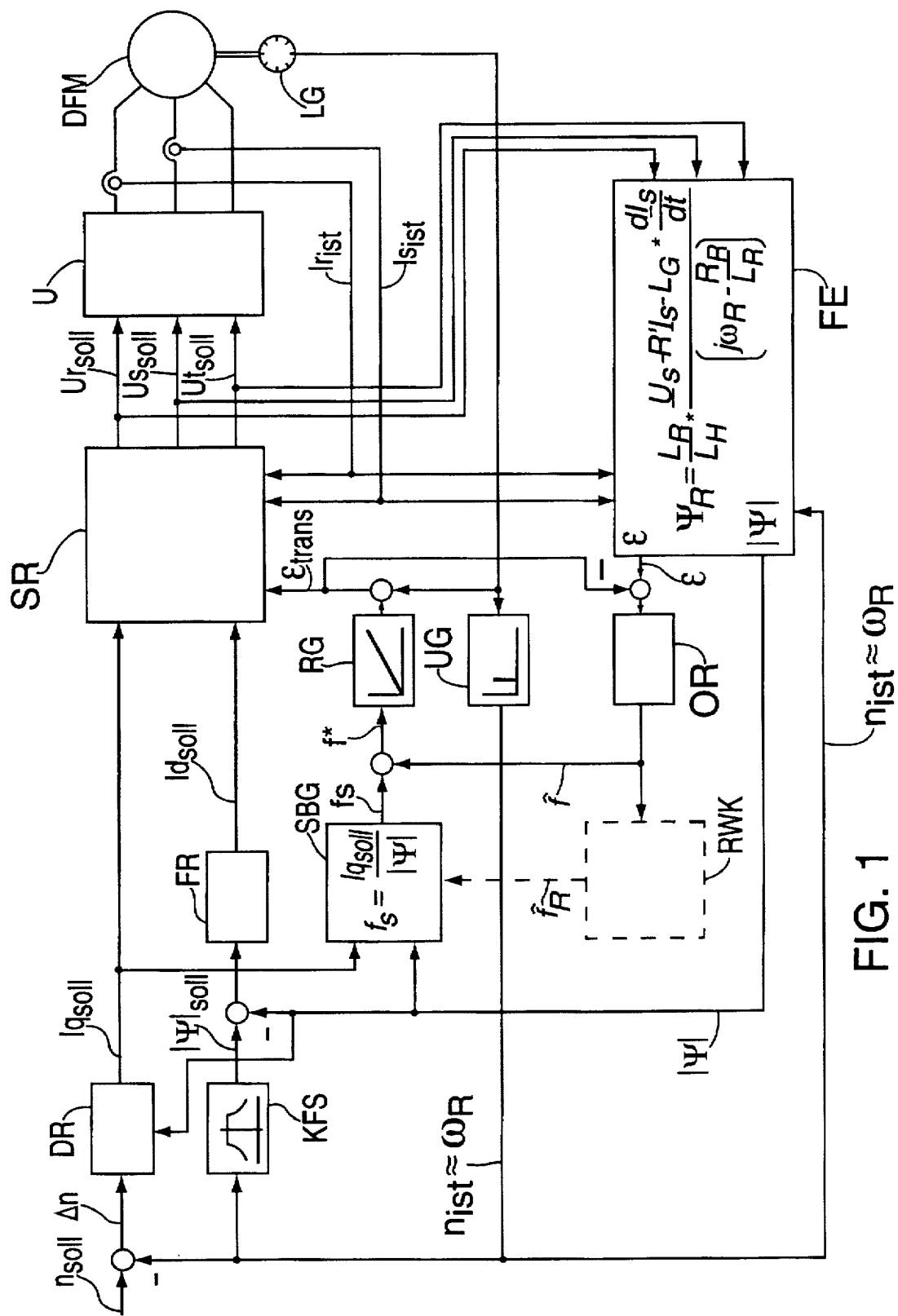
FIG. 1 shows a block schematic of a device for field-oriented control for a polyphase machine with determination of the rotor position.

In the drawings, similar elements are designated with the same reference characters, but similar elements need not necessarily be the same.

FIG. 1 shows a block schematic of a device for field-oriented control according to the present invention for a polyphase machine DFM with means LG for sensing the machine's rotor position. Reference is made here to a speed control application, although an application without speed control is also possible, for example, by direct input of a torque-producing quantity. This is expedient for example, when a known given torque is to be implemented.

In the illustrated embodiment, a reference speed $n_{soll}$ is defined at the input. The reference speed $n_{soll}$ is compared with an actual speed $n_{ist}$ and the differential result $\Delta n$ is fed to the input of a speed controller DR. The actual speed $n_{ist}$ is obtained either from a tachometer or, as illustrated in FIG. 1, from a conversion element UG using the position value determined by the position sensor LG.

Speed regulator DR may be designed like a PI regulator. A torque-producing quantity that corresponds to a reference torque is obtained as the output signal at the output of speed controller DR, namely, in the present embodiment, a torque-producing current component $Iq_{soll}$. This output signal goes to a first input of a current regulator SR whose other input receives a flux-producing signal that corresponds to the flux of the polyphase machine DFM that is to be controlled, namely, a flux-producing current $Id_{soll}$ in the present embodiment. The flux-producing quantity $Id_{soll}$ is supplied by a field regulator FR. The following description explains how the input signal of the field regulator FR is formed.

The voltages inducing the rotating field of the polyphase machine DFM are generated in current regulator SR in the form of three voltages $Ur_{soll}$, $Us_{soll}$ and $Ut_{soll}$, each of which is phase-shifted by 120° according to the comparison of reference and actual values at the inputs of current regulator SR. The quantities at the input in a coordinate system that rotates with the flux are transformed into output values in the stator coordinate system. The voltage reference values generated in this way are provided to a converter U that applies these voltages to the terminals of the polyphase machine DFM.

For further control of current regulator SR, two of the three current quantities that control the polyphase machine DFM, namely $Ir_{ist}$ and $Is_{ist}$ in the present embodiment, are fed back to the current regulator SR. In addition, these two current quantities are also fed to a flux computation unit FE. Other inputs of the computation unit FE receive the three voltages $Ur_{soll}$, $Us_{soll}$ and $Ut_{soll}$ that are phase shifted by 120° relative to each other at the output of current regulator SR.

In the flux computation unit FE, the magnitude and phase of the rotor flux are determined. This determination is performed in particular according to the following computation procedure which is especially suitable and makes it possible to determine the rotor flux $\Psi_R$ on the basis of suitable non-steady-state quantities of the stator of the polyphase machine DFM that are easy to determine. The computation procedure is carried out in accordance with the following relationship:

$$\Psi_R = \frac{L_R}{L_H} * \frac{U_S - R'I_S - L_G * \frac{dI_S}{dt}}{\left(j\omega_R - \frac{R_R}{L_R}\right)}$$

where:

$$R' = R_S + R_R * \frac{L_H^2}{L_R^2} \text{ and } L_G = L_S - \frac{L_H^2}{L_R}$$

and $L_R$=rotor inductance $L_H$=magnetizing inductance $L_S$=stator inductance $R_R$=rotor resistance $R_S$=stator resistance, and $\omega_R$=electric angular frequency of the rotor.

Other computation procedures can also be used to determine the flux if the stator flux or the main flux, for example, is used instead. The advantage of the computation procedure given above, however, is that it eliminates the need for integration, which thus eliminates complicated computation operations and also avoids the danger of generating major errors at the output from minor errors at the input. Additional computation time is saved by disregarding constant terms in the computation procedure such as the term $R_R/L_R$ in the denominator. This eliminates the need for division of complex numbers and division can be performed instead with real numbers, thereby permitting considerable savings in computation.

The computation procedure given above uses the non-steady-state parameters of the stator voltage vector $U_S$ and the stator current vector $I_S$ to determine the flux and thus goes beyond prior art methods that include only steady-state quantities. The electric angular frequency $\omega_R$ of the rotor is detected by the position sensor LG. The angular frequency is determined from the product of the number of pole pairs, the term $2\pi$ and the measured rpm. The signal thus determined is proportional to the actual speed $n_{ist}$ and is fed back for determining the difference $\Delta n$. The electric angular frequency signal is also fed to a characteristic for field attenuation block KFS and to the flux computation unit FE.

Through appropriate transformation of coordinates, the rotor flux $\Psi_R$ thus determined is converted into the flux amount or magnitude $|\Psi|$ and the flux angle $\epsilon$. The flux magnitude $|\Psi|$ determined in the flux computation unit FE is then fed back to field regulator FR and speed regulator DR. Field regulator FR is triggered at the input by a differential signal formed from the output signal of the characteristic for field attenuation block KFS, i.e., the field reference value $|\Psi|_{soll}$, and the flux magnitude $|\Psi|$. The desired flux value is injected through flux regulator FR. Errors in magnetizing reactance due to manufacturing tolerances, for example, and the resulting deviation in the true air gap from the air gap assumed in the motor model are reliably compensated by this type of flux control. As a result, full power can be achieved at any time, even when the motor parameters are not exactly identical to the parameters of the assumed model.

Orientation errors are detected by comparison of the transformation angle $\epsilon_{trans}$ with the flux angle $\epsilon$ and are corrected by adjusting the slip frequency $f_s$. To do so, in accordance with the device of FIG. 1, the actual flux angle $\epsilon$ determined in the flux computation unit FE is compared with the transformation angle $\epsilon_{trans}$, which appears on current regulator SR. The difference between the two signals is applied to an orientation regulator OR. The orientation regulator OR can also be designed like a PI controller. The slip frequency $f_s$ is determined by a slip determining unit SBG from the quotient of the torque-producing current component $Iq_{soll}$ and the flux magnitude $|\Psi|$ determined by the flux computation unit FE, after weighting with a constant factor, in accordance with the following computation procedure:

$$f_S = \frac{Iq_{soll}}{|\Psi|} * \frac{R_R}{2\pi} * \frac{L_H}{L_R}$$

The corresponding signals, namely the torque-producing output signal of the speed regulator DR, the current component $Iq_{soll}$ and the flux magnitude $|\Psi|$ determined by the flux computation unit FE are provided to the slip determining unit SBG. The slip frequency $f_s$, available at the output of the slip determining unit SBG, is then linked to a frequency signal $f$ that is proportional to the orientation error, if any, and which is available at the output of the orientation regulator OR. The corrected slip frequency f* resulting from this linkage is then sent to an integrator RG so a proportional angle signal is formed from the corrected slip frequency signal f*. The angle signal at the output of control element RG is linked with the rotor position detected by position sensor LG to form the transformation angle signal $\epsilon_{trans}$ which is fed to current regulator SR. In addition, the transformation angle $\epsilon_{trans}$ is sent back to the output of the flux computation unit FE, as described above, to determine the difference, if any, between the transformation angle signal and the flux angle $\epsilon$.

Since direct compensation of an orientation angle can lead to surges in torque or even to instability of the polyphase machine DFM, the orientation is corrected gradually and gently by integration, thus effectively preventing any torque surges.

If the actual speed $n_{ist}$ of the polyphase machine DFM is known, which is the case in the embodiment of FIG. 1, then the rotor resistance $R_R$ can be adjusted with a knowledge of the correction measure, i.e., the frequency signal $f$ that is proportional to the orientation error, if any, and which is obtained at the output of the orientation regulator OR. Such an optional embodiment of the present invention is shown in FIG. 1 in the form of an element RWK (shown with dotted lines) for rotor resistance correction with the corresponding signals (also shown with dotted lines). To do so, the frequency signal $f$ obtained at the output of the orientation regulator OR for the correction measure is sent to the rotor resistance correction block RWK as a proportional quantity $R$ for correction of the rotor resistance $R_R$. Such a correction of the rotor resistance $R_R$ is advantageous because deviations in the actual rotor resistance $R_R$ from the rotor resistance assumed in the model lead to deviations in slip frequency $f_s$ and thus to a faulty orientation of the polyphase machine.

Although the process according to the present invention for correcting the orientation with the help of orientation regulator OR permits an adjustment in orientation even if the rotor resistance $R_R$ is not readjusted, the transition behavior of the control structure for correcting the orientation is improved by an additional correction of the rotor resistance RWK and thus the orientation correction itself can be performed more rapidly. This is done on the basis of an improved transient recovery of orientation regulator OR that is obtained due to the additional rotor resistance correction, because the orientation regulator has the previous value for correcting the rotor resistance $R_R$ after subsequent adjustments in the slip frequency $f_s$. The transient recovery time is improved significantly in this way. This is advantageous especially in an implementation of the control device of the present invention as a digital controller with an assumed data model that contains the motor parameters and the rotor resistance value, because the rotor resistance value $R_R$ used as the basis for performing the computations according to the computation procedures described above can be adjusted to the correction value $R$ thus determined.

In the embodiment of FIG. 1, a direct correction of the slip frequency $f_s$ is achieved by providing a correction signal $f_R$ that corresponds to the rotor resistance correction RWK to the slip determining unit SBG, where the slip frequency that has been determined incorrectly due to the incorrect rotor resistance $R_R$ is corrected. This is accomplished, for example, by determining the rotor resistance $R_R$ pertaining to the output value of the orientation regulator. The rotor resistance is smoothed and sent to the output of the slip determining unit SBG, but this is not done until the torque of the polyphase machine DFM exceeds a preset threshold.

As an alternative to determining the rotor position by means of a position sensor LG mounted on the rotor axis of the polyphase machine DFM, it is also possible to use a similarly mounted tachometer that supplies the actual rpm $n_{ist}$ or the electric rotor angular frequency $\omega_R$, which is proportional to the rpm. Conversely, the corresponding rotor position must then be determined from this signal in a conversion element UG with a different design for linking with the output signal of the control element RG.

Figure 2:
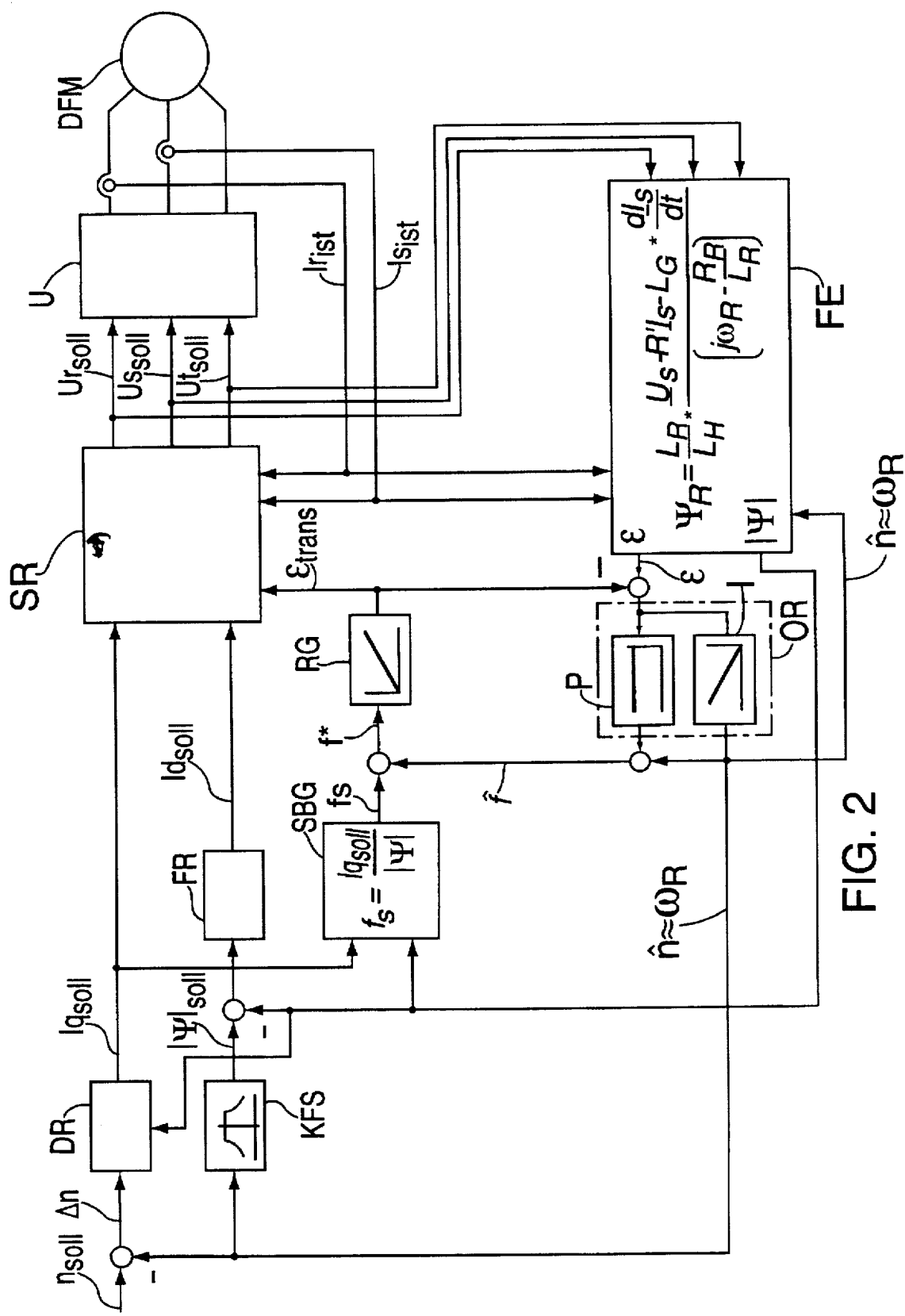
FIG. 2 shows a block schematic of a device for field-oriented control for a polyphase machine without determination of the rotor position.

FIG. 2 shows a block diagram of an alternative design of a device for field-oriented control of a polyphase machine DFM in which the rotor position or the actual rpm of the machine are not determined. The arrangement of elements in the block schematic corresponds essentially to the diagram according to FIG. 1, where elements with the same function are labeled with the same reference labels to facilitate comparisons. Wherever the functionality of the two alternative embodiments according to FIGS. 1 and 2 is the same, such elements will not be described again and instead the explanations presented earlier are understood to apply here as well. To this extent, the following discussion of the alternative embodiment according to FIG. 2 will be based mainly on the differences in comparison with the first embodiment.

The main difference between the embodiment of FIG. 2 and that of FIG. 1 is that the determination of rotor position is not necessary and thus it is not necessary to have a position sensor or a tachometer. Such position sensors are relatively expensive devices that are exposed to very strong environmental effects because of their proximity to the machine and that also have a negative effect on the installed dimensions of the machine as a whole. The embodiment of FIG. 2 is therefore particularly advantageous in applications where polyphase machines with the lowest possible sensitivity and the most compact possible design are needed. This is accomplished by the fact that instead of an actual rpm value that is determined directly from the output signal of the orientation regulator OR, which is shown with dotted lines in FIG. 2 and consists of a P regulator P and parallel I regulators I, a value $_n$ that is proportional to the actual speed is derived. This value is also proportional to the angular frequency $\omega_R$ of the rotor. Although the signal for correcting the orientation $\gamma$ is formed by linking the two components, the P regulator P and the I regulator I, the rpm-proportional signal $_n$ that is also proportional to the angular frequency $\omega_R$ of the rotor is derived only from the I regulator I component.

The rpm-proportional signal $_n$ is fed back to the flux computation unit FE and to the characteristic curve for field attenuation KFS and it acts as negative feedback on the rpm reference value $n_{soll}$ defined at the input. In an embodiment such as that of FIG. 2, there is no need for linking the rotor position thus determined with the output signal of the integrator RG, as in the embodiment of FIG. 1. There is no need for a conversion element UG. Thus, the advantages that can be achieved with the process according to this invention and a device created for carrying out this process can also be achieved with such a polyphase machine without having to determine the rotor position or speed.

If position control is also provided for the polyphase machine DFM for a specific application, a corresponding actual speed value or a value proportional to the electric rotor angular frequency $\omega_R$, which is available in the position control circuit anyway, can be used in another alternative embodiment.

The process and the device according to the present invention can be implemented in the form of both hardware and software. The latter variant is suggested especially for implementation of digital controllers that operate by the process according to the present invention. In particular, signal processors are recommended for implementation of the required computation units for carrying out the computation procedures described above. This is especially true for implementation of the flux computation unit FE. Such digital control system designs for field-oriented control according to the present invention are based, as indicated by the two embodiments presented here, on the principle that a current and a voltage are injected according to their quantity and the angle between the two according to model data given for the polyphase machine, so this polyphase machine must deliver the proper power as mechanical power even if the actual motor characteristics of a given polyphase machine differ from the model data on which the digital control system is based.

In an alternative procedure, traditional methods of field-oriented control and the method of the present invention can be combined by keeping the previous current model according to a traditional method in the lower speed range of the polyphase machine, because the flux determination here is sometimes inaccurate due to the low voltage. In the upper speed range, however, where the advantages of the flux determination can be utilized without restriction, the disadvantages of the conventional approaches are eliminated by using the process and device of the present invention.

The above description of preferred embodiments of the present invention is given for the purpose of illustration, but is not exhaustive. Nor is the present invention limited to the precise form described here, but instead numerous modifications and changes are also possible within the context of the above disclosure. Preferred embodiment have been described to illustrate the basic details of the present invention and practical applications to enable those skilled in the art to implement this invention. Numerous additional modifications may be implemented for special applications.

What is claimed is:

1. A process for field-oriented control of a polyphase machine, comprising the steps of:

generating a torque-producing quantity;

generating a flux-producing quantity and regulating the flux-producing quantity with a field control circuit;

determining a magnitude and an angle of a rotor flux of the machine;

applying the magnitude of the rotor flux to the field control circuit;

correcting orientation errors in a field axis of the machine by adjusting a slip frequency in accordance with a difference between a transformation angle and the angle of the rotor flux; and generating at least one of a set of voltages and a set of currents which create a rotating field of the machine in accordance with the corrected reference values.

2. The process according to claim 1, wherein the rotor flux is determined from non-steady-state quantities of a stator voltage vector $U_S$ and of a stator current vector $I_S$ so that:

$$\Psi_R = \frac{L_R}{L_H} * \frac{U_S - R'I_S - L_G * \frac{dI_S}{dt}}{\left( j\omega_R - \frac{R_R}{L_R} \right)}$$

where:

$$R' = R_S + R_R * \frac{L_H^2}{L_R^2} \text{ and } L_G = L_S - \frac{L_H^2}{L_R}$$

$\Psi_R$=rotor flux $L_R$=rotor inductance $L_H$=magnetizing inductance $L_S$=stator inductance $R_R$=rotor resistance $R_S$=stator resistance, and $\omega_R$=electric rotor angular frequency, and wherein the magnitude and the angle of the rotor flux are determined from the rotor flux by transformation of coordinates.

3. The process of claim 1, comprising the step of determining an electric rotor angular frequency by measuring at least one of an actual speed and a position of the machine rotor.

4. The process of claim 1, comprising the step of determining an electric rotor angular frequency from at least one of a signal for correcting orientation and a signal of a position control circuit.

5. The process according of claim 1, wherein:
the orientation errors are corrected gradually by integral compensation; and
the slip frequency is determined as a quantity that is proportional to the quotient of the torque-producing quantity and the magnitude of the rotor flux.

6. The process of claim 1, comprising the step of deriving a correction signal for correcting a rotor resistance.

7. A device for field-oriented control of a polyphase machine, the device comprising:
means for generating a flux-producing quantity;
means for generating a torque-producing quantity;
means for determining a magnitude and an angle of a rotor flux;
means for regulating the field axis;
means for compensating for orientation errors in the field axis by adjusting a slip frequency in accordance with an orientation correction signal which is generated in accordance with a difference between a transformation angle and the angle of the rotor flux; and
means for determining at least one of a set of voltages and a set of currents which create a rotating field of the machine in accordance with the corrected reference quantities.

8. The device of claim 7, wherein the rotor flux is determined by a computation unit so that:

$$\Psi_R = \frac{L_R}{L_H} * \frac{U_S - R'I_S - L_G * \frac{dI_S}{dt}}{\left(j\omega_R - \frac{R_R}{L_R}\right)}$$

-continued where:

$$R' = R_S + R_R * \frac{L_H^2}{L_R^2} \text{ and } L_G = L_S - \frac{L_H^2}{L_R}$$

$\Psi_R$=the rotor flux
$L_R$=rotor inductance
$L_H$=magnetizing inductance
$L_S$=stator inductance
$R_R$=rotor resistance
$R_S$=stator resistance, and
$\omega_R$=electric angular frequency of the rotor; and wherein:
the magnitude and the angle of the rotor flux are determined by transformation of coordinates; and
the slip frequency is determined by a slip determining unit as a quantity that is proportional to the quotient of the torque-producing quantity and the magnitude of the rotor flux.

9. The device of claim 7, comprising at least one of a tachometer and a position sensor for determining at least one of an actual speed and a rotor position of the polyphase machine, wherein an output signal of the tachometer or of the position sensor is used to determine an electric angular frequency of the rotor.

10. The device of claim 7, wherein a further signal is derived from the orientation correction signal, the further signal corresponding to an actual rotational speed of the polyphase machine.

11. The device of claim 7, comprising means for correcting the rotor resistance in accordance with the orientation correction signal.

* * * * *